(12) United States Patent
Hager et al.

(10) Patent No.: US 6,689,064 B2
(45) Date of Patent: Feb. 10, 2004

(54) ULTRASOUND CLUTTER FILTER

(75) Inventors: Richard A Hager, Derry, NH (US);
David W Clark, Windham, NH (US);
Karl E Thiele, Andover, MA (US);
Jerome F Witt, Andover, MA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 77 days.

(21) Appl. No.: 09/887,648

(22) Filed: Jun. 22, 2001

(65) Prior Publication Data

US 2003/0069505 A1 Apr. 10, 2003

(51) Int. Cl.[7] .............................................. A61B 8/12
(52) U.S. Cl. ........................................ 600/454; 600/465
(58) Field of Search ................................. 600/437–472

(56) References Cited

U.S. PATENT DOCUMENTS

| | | | |
|---|---|---|---|
| 4,016,528 A | | 4/1977 | Takeuchi .................... 340/1 R |
| 5,152,292 A | * | 10/1992 | Karp ........................... 600/454 |
| 5,197,477 A | | 3/1993 | Peterson et al. ........ 128/661.08 |
| 5,228,009 A | | 7/1993 | Forestieri et al. ............ 367/135 |
| 5,304,940 A | | 4/1994 | Harasawa et al. |
| 5,494,037 A | * | 2/1996 | Banjanin et al. ............. 600/455 |
| 5,544,659 A | | 8/1996 | Banjanin |
| 5,860,930 A | * | 1/1999 | Guracar ....................... 600/455 |
| 5,910,118 A | | 6/1999 | Kanda et al. |
| 5,971,927 A | * | 10/1999 | Mine ........................... 600/455 |
| 6,001,063 A | * | 12/1999 | Guracar ....................... 600/443 |
| 6,146,331 A | * | 11/2000 | Wong .......................... 600/454 |
| 6,196,972 B1 | * | 3/2001 | Moehring .................... 600/453 |
| 6,224,557 B1 | * | 5/2001 | Ziel et al. .................... 600/455 |
| 6,309,357 B1 | * | 10/2001 | Guracar et al. ............. 600/454 |
| 6,402,694 B1 | * | 6/2002 | Bae et al. .................... 600/453 |

FOREIGN PATENT DOCUMENTS

EP 1067400 A 1/2001

OTHER PUBLICATIONS

Kay, Steven M., "Modern Spectral Estimation Theory and Application", Prentice Hall, 1988.
Clarkson, Peter M., "Optimal and Adaptive Signal Proceeding", CRC Press, 1993.
Ikoma, Norikazu and Maeda, Hiroshi, "Adaptive Order Selection with Aid of Genetic Algorithm", 1999.

* cited by examiner

Primary Examiner—Francis J. Jaworski
Assistant Examiner—William C Jung
(74) Attorney, Agent, or Firm—John Vodopia

(57) ABSTRACT

A method for adaptive filtering of clutter from a sample stream having a blood signal component and a clutter signal component comprises the steps of (a) estimating a signal strength of the sample stream, and (b) determining an order of a filter based on a relationship between the signal strength estimate and a signal strength threshold. The filter receives the sample stream and provides an output stream having a reduced level of the clutter signal component relative to the blood signal component.

24 Claims, 6 Drawing Sheets

ULTRASOUND CLUTTER FILTER

BACKGROUND OF THE INVENTION

1. Field of the Invention

The invention is directed toward medical imaging systems, and more particularly toward minimizing unwanted clutter signals in an estimation of blood velocity while maintaining sensitivity to low velocity blood flow.

2. Description of the Prior Art

Diagnostic ultrasound equipment transmits sound energy into the human body and receives signals reflecting off tissue and organs such as the heart, liver, kidney, etc. These sound waves also reflect off blood cells that move through vessels and capillaries in tissue. Signals received by ultrasound devices are the a vector sum of waves reflecting off tissue components, e.g., heart wall, vessel wall, etc., and waves reflecting off blood cells.

Blood flow patterns are obtained from Doppler shifts or shifts in time domain cross correlation functions, due to blood cell motion, of reflected sound waves and displayed in a two-dimensional format known as Color Flow Imaging or Color Velocity Imaging. Generally, the amplitudes of reflected components for structures such as the heart or vessel walls have lower absolute velocities and are 20 dB to 40 dB (10–100 times) larger than reflected components due to blood cells. Algorithms that estimate blood velocities must account for effects due to clutter, that is, signal components from "stationary" or slowly moving structures such as the heart, liver, etc.

Prior art devices used fixed-frequency, fixed-order filtering techniques to remove or reduce the impact of clutter in velocity estimation. Also, prior art devices have used adaptive techniques such as null steering (see U.S. Pat. Nos. 4,016,528 and 5,197,477) to reduce or eliminate effects due to clutter. Still others propose parametric techniques to account for clutter (U.S. Pat. No. 5,228,009).

Generally, filter-based techniques require less computation than parametric techniques. However, filter-based techniques suffer from fixing the order of the filter. Filter-based techniques must assume clutter is sufficiently narrow band for fixed order filtering, otherwise the filter order must be over-specified to account for worst case clutter conditions.

SUMMARY OF THE INVENTION

It is an object of the present invention to provide a filtering technique that minimizes unwanted clutter signals in the estimate of blood velocity while maintaining sensitivity to low velocity blood flow.

It is another object of the present invention to provide an autoregressive parametric technique that dynamically and adaptively modifies filter coefficients and filter order, providing optimum filtering in the presence of low level or high level clutter.

This invention addresses clutter reduction in two ways. Firstly, it modifies the order of the clutter filter based on the power and mean frequency of the ultrasound blood plus clutter signal. Secondly, it modifies clutter filter coefficients based on concepts set forth in linear prediction and adaptive lattice filtering.

Accordingly, the present invention provides a system and method for implementing a clutter filter based on concepts in the field of linear prediction. The filter increases the order of the filter and determines filter coefficients based on the input signal and user definable control inputs. The filter coefficients are determined such that the filter zeros correspond to partial correlation coefficients, or are on the unit circle at the frequency of the partial correlation coefficients, or are selected from a predefined table of filter coefficients. Dynamic and adaptive modification of filter order and filter coefficients allows fine tuning the clutter filter based on a particular application or tissue type.

The method acquires clutter and blood data. Next, the signal strength and frequency of the data are estimated. Through an iterative process, the signal strength and frequency are each determined to be within one of several ranges, and the data is processed according to those signal strength and frequency ranges. The data may be passed unaltered, filtered according to a reflection coefficient or filtered according to a predefined filter coefficient.

DETAILED DESCRIPTION OF THE INVENTION

Figure 1:
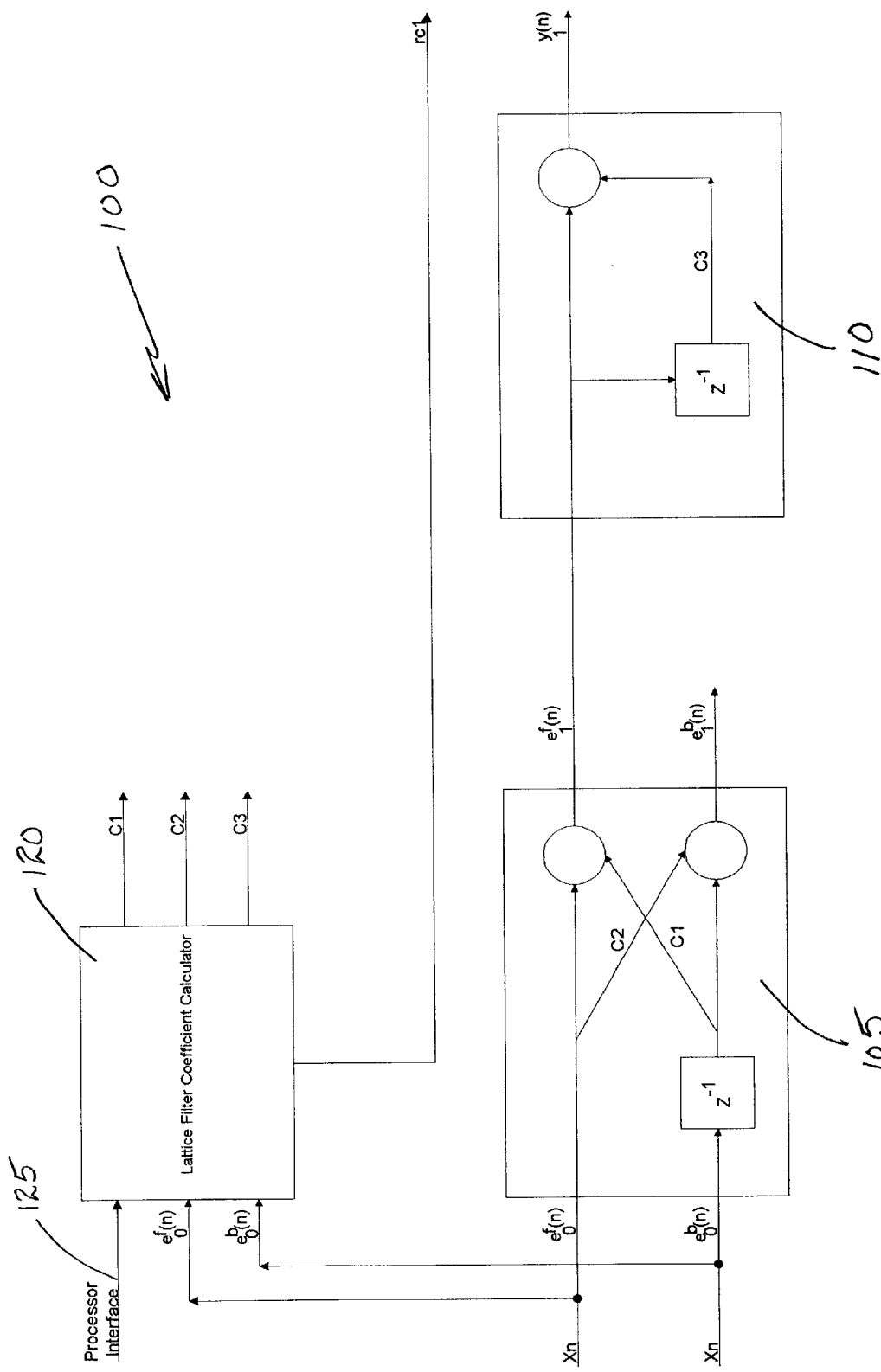
FIG. 1 is a block diagram of a clutter filter in accordance with the present invention.

A Color Flow Image or Color Velocity Image is composed of velocity estimates collected along radial image lines. One radial image line of velocity estimates is obtained from a set of ultrasonic Pulse-Echo sequences. Typically, one line of velocity estimates is composed of from 4 to 16 Pulse-Echo sequences or Pulse Repetition Periods. As discussed below, the present invention stems from two physiologic observations.

The first observation is that clutter, i.e., the unwanted portion of a physiologic ultrasound echo return, tends to be highly correlated. This high degree of correlation exists both in fast time, along the depth dimension, and in slow time, from one Pulse Repetition Period to the next. Clutter signals typically have a slow phase variation from one pulse echo period to the next, and as such, tend to be low frequency signals with a narrow bandwidth. Echo data that is collected at a given depth and across multiple pulse repetition periods is termed a flow packet. The present invention is directed towards clutter that exists in slow time across a flow packet. Linear predictive filtering adaptively removes correlated components of a data stream. In the case of color flow imaging, the data stream is a flow packet. Thus, the present filtering scheme, which is based on linear prediction techniques, is well suited for removing clutter from a signal that includes both echoes from blood and from clutter.

The second observation is that the magnitude of a clutter signal can range from being much larger than that of a desired blood signal, to being smaller than that of the desired blood signal. When the clutter signal magnitude is much larger than that of the desired blood signal, such as in or near the walls of the heart, the clutter filter preferably provides a high degree of filtering. However, when clutter is lower in magnitude than the desired signal, such as in the center of the heart's left ventricle, a clutter filter preferably provides very little filtering of the combined blood and clutter signals.

Both of these observations give rise to the filter architecture of the present invention, which combines the concepts of linear predictive filtering and selection of filter order on the basis of signal strength. More particularly, the filter architecture is based on linear prediction lattice filtering.

Linear predictive filtering is a technique that estimates the spectral content of a signal by appropriate selection of filter coefficients. A signal can be thought of as a summation of a set of sinusoids and noise. As an example, for a signal that is composed of two sinusoids at two different frequencies and Gaussian noise, a linear predictive filter can be built which will filter out the coherent or sinusoidal components and leave the incoherent or noise components. The filter coefficients for this filter can be determined using constrained minimization techniques. Burg developed a method that estimates these filter coefficients also know as reflection coefficients, by minimizing both forward and backward mean square prediction errors or prediction error power.

Prediction error is the difference between an actual signal value and a signal value predicted from future or past signal values. The difference between the actual signal and a signal value predicted from past signal values is termed forward prediction error. The difference between the actual signal and a signal value predicted from future signal values is termed backward prediction error. Linear prediction is a technique that identifies the principal or coherent components of a signal. Linear prediction identifies these coherent signal components by selecting filter coefficients that minimize prediction error.

A thorough explanation of forward and backward prediction error can be found in either Kay, Steven M., Modern Spectral Estimation—Theory and Application, Prentice Hall, 1987, or Clarkson, Peter M., Optimal and Adaptive Signal Processing, CRC Press, 1993. Kay provides a detailed description of linear prediction lattice filtering in "Modern Spectral Estimation Theory and Application", Prentice Hall, 1988.

In the above example, the input signal is composed of two sinusoids. The ability of the linear predictive filter to remove both sinusoid signal components is a function of the length or order of the filter. For the above example, a second order predictor is sufficient for completely filtering the sinusoidal components of the input signal. The sinusoidal components are filtered by placing filter zeros at the frequency of the signal components.

The frequency response of a finite impulse response (FIR) filter is described by a polynomial. The roots of this polynomial describe where in the frequency domain the output of filter approaches zero. A lattice filter is a FIR filter that offers an alternative to the direct form implementation of a digital FIR filter. The lattice filter provides a modular structure and is easy to test for stability. The lattice filter has advantages in finite word length implementations and has low sensitivity to quantization noise.

The Burg method is used to estimate the reflection coefficients, and then a Levinson recursion is used to obtain autoregressive (AR) parameter estimates. The reflection coefficient estimates are obtained by minimizing estimates of the prediction error power for different order predictors in a recursive manner. The Burg algorithm allows the zeros to move within or on the unit circle. The location of the zeros is data dependent. For narrow bandwidths, the zeros are on the unit circle, while for wide bandwidths the zeros are within the unit circle. Other prediction algorithms exist, and the filter architecture of the present invention can use any convenient algorithm for determining filter coefficients.

The reflection coefficients, which are derived from the Burg method, are also known as filter coefficients, and these filter or reflection coefficients are determined from the input data by a process of partial correlation. Partial correlation allows examination of the relationship between two variables with the statistical effect from a third variable (or third and forth etc.) removed from both. The result is that the filter or reflection coefficients are equal to the negative of the partial correlation coefficients.

One embodiment of the present invention is a method for adaptive filtering of clutter from a sample stream having a blood signal component and a clutter signal component. In brief, the method comprises the steps of (a) estimating a signal strength and a frequency of the sample stream, and (b) determining a zero of a filter based on a linear prediction analysis of the sample stream when the signal strength estimate falls within a predetermined range of signal strengths and when the frequency estimate falls within a predetermined range of frequencies. The filter receives the sample stream and provides an output stream having a reduced level of the clutter signal component relative to the blood signal component. Thus, filter order and filter coefficients are based on input signal level, signal frequency, predefined thresholds and predefined filter coefficients. Dynamic and adaptive determination of filter zeros allows fine tuning the clutter filter based on application or tissue type. In addition, filter order may be changed according to signal strength and signal frequency. The relationships between signal strength, frequency and filter order are programmable via lookup tables. This programmability allows the systems designer to optimize the filter performance based on the application.

FIG. 1 is a schematic of a clutter filter 100, particularly suited for use in an ultrasound system. Clutter filter 100 includes a first order lattice filter 105, a first order finite impulse response (FIR) filter 110 and a coefficient calculator 120. Coefficient calculator 120 is a controller that receives a sample stream of ultrasound data corresponding to blood and clutter. Coefficient calculator 120 generates one or more filter coefficients based on a signal strength threshold, a signal frequency threshold, and the sample stream. Collectively, lattice filter 105 and FIR filter 110 operate as a filter that receives the sample stream and the filter coefficients, and has a variable configuration that is defined by the filter coefficients. The variable configuration includes (a) a variable order, (b) an adaptive zero selection and (c) a variable center frequency. Clutter filter 100 produces a clutter reduced blood signal.

A filter zero causes the filter output to approach zero at a specific frequency, hence the term "filter zero". Filter order is the number of zeros defined in the filter. Zero selection is a defining of one or more frequencies at which zeros are located.

Coefficient calculator 120 is a controller that has a user definable input via a processor interface 125, and also receives an input signal x(n), i.e., a sample stream, comprised of both clutter and blood data. Input signal x(n) includes a zeroth forward prediction error $e_0^f(n$ and a zeroth backward prediction error $e_0^b(n$. For clutter filter 100 the zeroth forward and backward prediction error signals are equal to the input signal x(n). A lookup table (see the description of FIG. 4, below) in lattice filter coefficient calculator 120 defines the order of clutter filter 100 and the formulation of the filter coefficient by coefficient calculator 120, depending on the signal strength and mean frequency of input signal x(n). Coefficient calculator 120 provides outputs for filter coefficients C1, C2 and C3 and reflection coefficient rc1. Reflection coefficient rc1=k1 as determined in equation 1 below, where m=1. Filter coefficients C1 and C2 are used by lattice filter 105, and filter coefficient C3 is used by FIR filter 110 to reduce the clutter component of input signal x(n).

Lattice filter 105 receives input signal x(n), and receives filter coefficients C1 and C2 from coefficient calculator 120. Lattice filter 105 produces a forward prediction error $e_1^f(n)$ and a backward prediction error $e_1^b(n)$. Forward prediction error $e_1^f(n)$ is provided as an input to FIR filter 110.

FIR filter 110 receives forward prediction error $e_1^f(n)$ from lattice filter 105, and filter coefficient C3 from coefficient calculator 105. FIR filter 110 produces a clutter-reduced output $y_1(n)$.

Clutter Filter 100 outputs are $y_1(n)$, $e_1^b(n)$ and $rc_1$. These clutter filtered outputs, $y_1(n)$ and $e_1^b(n)$, and/or the $rc_1$ output of the lattice filter coefficient calculator 120 can be used by a down stream velocity estimator to determine the velocity of either tissue or blood.

As an illustration of the operation of clutter filter 100, coefficient calculator 120 computes the reflection coefficient of lattice filter 105 according to one of the following formulations:

$$k_1 = \frac{-2\sum_{n=1}^{N-1} e_0^f[n] \cdot e_0^b[n-1]^*}{\sum_{n=1}^{N-1} |e_0^f[n]|^2 + |e_0^b[n-1]|^2}$$

(Zero according to Burg Linear Prediction), or $$k_1 = \frac{-\sum_{n=m}^{N-1} e_0^f[n] \cdot e_0^b[n-1]^*}{\left|\sum_{n=1}^{N-1} e_0^f[n] \cdot e_0^b[n-1]^*\right|} \quad \text{(Zero on the unit circle)},$$

where:
N=number of samples in a flow packet;
$e_{m-1}^f(n)$=Forward prediction error,
$e_{m-1}^b(n)$=Backward prediction error,
$e_{m-1}^b[n-1]^*$=Complex conjugate of $e_{m-1}^b[n-1]$,
$e_0^b(n)=e_0^f(n)=x(n)$,
m=the lattice filter stage (for lattice filter 105, m=1).

Coefficient calculator 120 computes both the strength and mean frequency of input signal x(n). Coefficient calculator 120 uses the strength and mean frequency of input signal x(n), in addition to a processor programmable lookup table, to determine whether one of the above formulations of $k_m$ or a predefined set of filter coefficients should be used for C1, C2, C3.

For this example, the lookup table of lattice filter coefficient calculator 120 has been programmed to assign C1 and C2, the filter coefficients for lattice filter 105, to the following for several power levels of input signal x(n). The absolute values of power for input signal x(n) which define high, medium and low power will depend on the particular combination of ultrasound system, ultrasound transducer, and tissue type being imaged. However, for a cardiac imaging case, high power would be defined by the epicardium, medium power would be defined by myocardium, low power would be defined by the endocardium, and a region in the middle of the left ventricle would define very low power.

Power Range 1

For high input power conditions of x(n), filter coefficients C1, C2 and C3 are chosen as follows:

$$C1 = k_1 = \frac{-\sum_{n=1}^{N-1} x[n] \cdot x[n-1]^*}{\left|\sum_{n=1}^{N-1} x[n] \cdot x[n-1]^*\right|},$$

C2=0, and C3=C1.

Power Range 2

For medium input power conditions of x(n), filter coefficients C1, C2 and C3 are chosen as follows:

$$C1 = k_1 = \frac{-\sum_{n=1}^{N-1} x[n] \cdot x[n-1]^*}{\left|\sum_{n=1}^{N-1} x[n] \cdot x[n-1]^*\right|},$$

C2=0, and C3=0.

Power Range 3

For low input power conditions of x(n), filter coefficients C1, C2 and C3 are chosen as follows:

$$C1 = k_1 = \frac{-2\sum_{n=1}^{N-1} x[n] \cdot x[n-1]^*}{\sum_{n=1}^{N-1} |x[n]|^2 + |x[n-1]|^2},$$

$C2=k_1^*$, and C3=0.

Power Range 4

For very low input power conditions of x(n), the coefficients for lattice filter 105 are chosen to provide fixed filtering with a zero at DC. Thus the filter coefficients for lattice filter 105 are chosen to be C1=0, C2=0, and the filter coefficient for FIR filter 110 is chosen to be C3=−1.

Filter coefficients C1, C2 and C3 from coefficient calculator 120 are fed to lattice filter 105 and FIR filter 110. The order of clutter filter 100 is second order for Power Range 1 by setting filter coefficient C3=C1, and first order for Power Ranges 2 through 4 by setting filter coefficient C3=0. Clutter filter 100 for Power Range 3 is first order and the filter coefficient is based on Berg linear prediction. Input signal x(n) is thus filtered by lattice filter 105 and subsequently filtered by FIR filter 110 to produce clutter reduced outputs $y_1(n)$ and $e_1^b(n)$.

In the above example, the filter zeros for lattice filter 105 do not necessarily correspond to the Doppler shifted frequencies of blood or clutter in the input x(n). Particularly in Power Range 3 where x(n) is a low power signal, the clutter and blood signal components can have similar amplitudes and different frequencies. Under these conditions the frequency of the lattice filter zero will actually lie between the Doppler shifted frequency of the blood component and the Doppler shifted frequency of the clutter component.

Traditional velocity estimators incorrectly estimate the blood velocity for Power Range 3 to lie between the Doppler shifted frequency of the blood and clutter components. Under the assumption that absolute blood velocities are greater than clutter velocities, a more accurate determination of the blood mean frequency for Power Range 3 can be estimated via a combination of reflection coefficient $k_m$ and outputs $e_1^b(n)$ and y(n). This filtering and estimation process is known as Autoregressive Signal Modeling. Autoregressive Signal Modeling provides autoregressive (AR) coefficients through a technique known as the Levinson recursion as follows:

$$k_m = -\frac{\sum_{n=m}^{N-1} e_{m-1}^f[n] e_{m-1}^b[n-1]^*}{\sum_{n=m}^{N-1} |e_{m-1}^f[n]|^2 + |e_{m-1}^b[n-1]|^2} \qquad (1)$$

$$a_m[i] = k_m; \; i=m, \; m=1,2,3,\ldots p \qquad (2)$$

$$a_m[i] = a_{m-1}[i] + k_m a^*_{m-1}[m-i]; \; i=1,2,\ldots m-1; \; m=2,3,\ldots p \qquad (3)$$

where p is the model order and AR model coefficients are given by $a_p[1], a_p[2] \ldots a_p[p]$.

These AR coefficients can be used to estimate mean-Doppler-frequency of blood and/or clutter components of ultrasonic signals. Depending on the filter and/or model order, blood velocity can be estimated from the angle of resulting AR coefficients or estimated from the angle of the roots of the resulting AR system. As an additional example, for a second order model, p=2, with C1, C2 and C3 set as indicated above, and the resulting AR system is a second order polynomial;

$$AR \text{ system} = 1 + a_1[1] \cdot z^{-1} + a_2[2] \cdot z^{-2} \qquad (4)$$

The roots of this second order system are given by the quadratic formula:

$$r_1, r_2 = \frac{-a_2[1] \pm \sqrt{a_2[1]^2 - 4a_2[2]^2}}{2} \qquad (5)$$

The angle of these roots describe clutter and blood mean frequencies. The root associated with clutter is determined by looking at $r_1, r_2$ relative to DC. The angle of the clutter root is assumed to be closer to DC than is the Doppler root. Having determined the proper root for blood versus clutter, a velocity estimate is made by taking the arctangent of r(blood).

In addition to the formulation for $k_m$, in equation 1, based on the Burg AR modeling method, this invention makes use of the formulation for $k_m$ in equation 6.

$$k_m = -\frac{\sum_{n=m}^{N-1} e_{m-1}^f[n] e_{m-1}^b[n-1]^*}{\left|\sum_{n=m}^{N-1} e_{m-1}^f[n] e_{m-1}^b[n-1]^*\right|} \qquad (6)$$

The formulation for the reflection coefficient in equation 6, and used in Power Range 1 and 2 above, constrains the zeros of lattice filter 105 and FIR filter 110 to lie on the unit circle. This formulation is used in conditions of high power moving clutter such as the heart wall. Forcing the zero to lie on the unit circle places the filter's zero on the high power coherent clutter signal. The above example describes a mode of operating clutter filter 100. Both the order of the filter and the formulation of the filter coefficients are modified based on the input power of x(n). Lattice filter coefficient calculator 120 computes the input power of x(n). Power Range 1 illustrates a second order clutter filter that provides very aggressive filtering of the moving clutter signal. Power Range 3 illustrates a first order clutter filter that provides less aggressive filtering of the moving clutter signal. Power Range 3 would be suitable for clutter filtering near the endocardium of the heart.

The above example, which divides the input signal into 4 different Power Ranges, illustrates the flexibility of the filter architecture of the present invention, but it is not the only manner of for using the filter architecture. Lattice Filter coefficient calculator 120 also computes the mean frequency of input signal x(n). This mean frequency information, in conjunction with the power level of input signal x(n), can be used to further qualify the conditions under which a first order filter (Power Range 2, 3 or 4) or second order filter (Power Range 1) are used. Additionally, the conditions under which equation 1, equation 6 or fixed filtering such as Power Range 4 are used, can be further defined. This mean frequency of input signal x(n) could also be used to limit the amount of filtering used if the input frequency exceeded a threshold. This feature could be useful, for example, under very low clutter conditions in the left ventricle of the heart. Clutter filter 100 can be set to adaptively filter based on equation 1 or 6 when the mean frequency of input signal x(n) is below a frequency threshold or use fixed non-adaptive filtering such as in Power Range 4 above, when the input frequency is equal to or above the frequency threshold.

Clutter filter 100 can also be cascaded into a pth order filter. In a pth order filter, for each filter stage, the forward and backward prediction errors may be supplied to the next filter stage, or they may be used by a downstream velocity estimator. The velocity estimator can be a simple lag 1 autocorrelator or a more complicated pth order AR model such as the second order AR model described in equations 2, 3, 4 and 5. Higher order AR velocity estimators may be used to more accurately estimate blood velocity in the presence of clutter containing multiple signal components. These multiple signal components can be due to heart wall motion and heart valve motion sampled by the side lobes of the ultrasound-imaging beam. Thus, clutter filter 100, shown in FIG. 1, and the cascaded version of FIG. 2, described below, can be used in conjunction with several velocity estimation algorithms.

Figure 2:
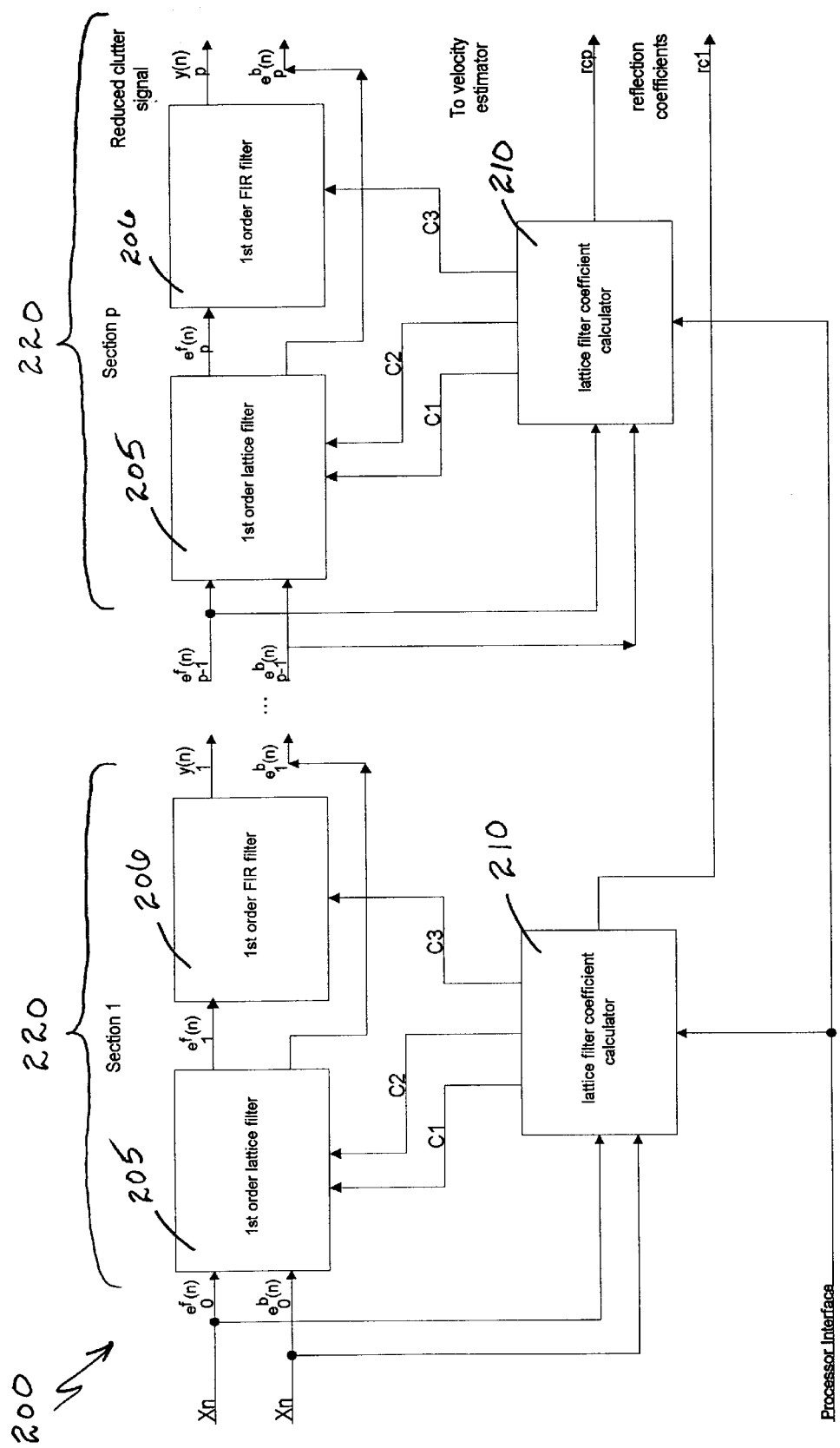
FIG. 2 is a block diagram of a preferred embodiment of a clutter filter in accordance with the present invention.

FIG. 2 is a block diagram of a preferred embodiment of a linear predictive lattice clutter filter 200 in accordance with the present invention. Filter 200 is a cascaded implementation of clutter filter 100, each represented as a filter section 220. Filter 200 includes p first order lattice filter sections 205 (see reference 105 in FIG. 1), p first order FIR filter sections 206 (see reference 110 in FIG. 1), and p lattice filter coefficient calculators 210 (see reference 120 in FIG. 1). In each section 220, coefficient calculator 210 controls a lattice filter 205 and a FIR filter 206.

Each coefficient calculator 210 has a first, second, and third input. The first input corresponds to a processor connection for programming a lookup table (see the description of FIG. 4, below) within each coefficient calculator 210. A command to the lookup table determines the input power levels and input mean frequencies at which equations 1 and 6 and the configuration of the filter, as described in Power Range 1–4 above, are used. The second and third inputs correspond to input $e_{m-1}^{f}(n)$ and $e_{m-1}^{b}(n)$, as described earlier for FIG. 1.

For the coefficient calculator 210 in the first section 220, m=1, of filter 200, the two inputs $e_{m-1}^{f}(n)$ and $e_{m-1}^{b}(n)$ are taken from input signal x(n). For the coefficient calculators 210 in subsequent sections 220, m=2, 3, . . . p, the inputs $e_{m-1}^{f}(n)$ and $e_{m-1}^{b}(n)$ are taken from $y_{m-2}(n)$ and $e_{m-1}^{b}(n)$ outputs, respectively, (see FIG. 1) of a preceding filter section 220.

Each coefficient calculator 210 provides filter coefficient outputs to its corresponding lattice filter 205 and FIR filter 206. These filter coefficients correspond to the filter coefficient C1, C2 and C3, as described for FIG. 1. Additionally, coefficient calculator 210 provides the reflection coefficient rcm computed according to equation 1, where rcm=km, m=1,2,3, . . . p and p is the order of the filter, for use by a downstream velocity estimator.

Each coefficient calculator 210 computes equation 1, and equation 6 for the reflection coefficient $k_m$. Each coefficient calculator 210 selects, according to a programmable lookup table and depending on the power and mean frequency of inputs $e_{m-1}^{f}(n)$ and $e_{m-1}^{b}(n)$, the coefficients used for its respective filter section 220. These filter coefficients can be computed based on the Power Range 1–4 scenario described above or some other recipe that may be determined empirically.

The last filter section 220 provides an output $y_p(n)$. This output $y_p(n)$ represents the blood signal with clutter removed. A down stream velocity estimator can use either $y_p(n)$ directly to estimate the velocity by lag 1 autocorrelation, or in combination with rc1 through rcp from coefficient calculators 210, to determine blood Doppler frequency, as described above by equations 2, 3, 4 and 5. The flexibility of this architecture allows the clutter filter to be optimized for multiple applications.

Figure 3:
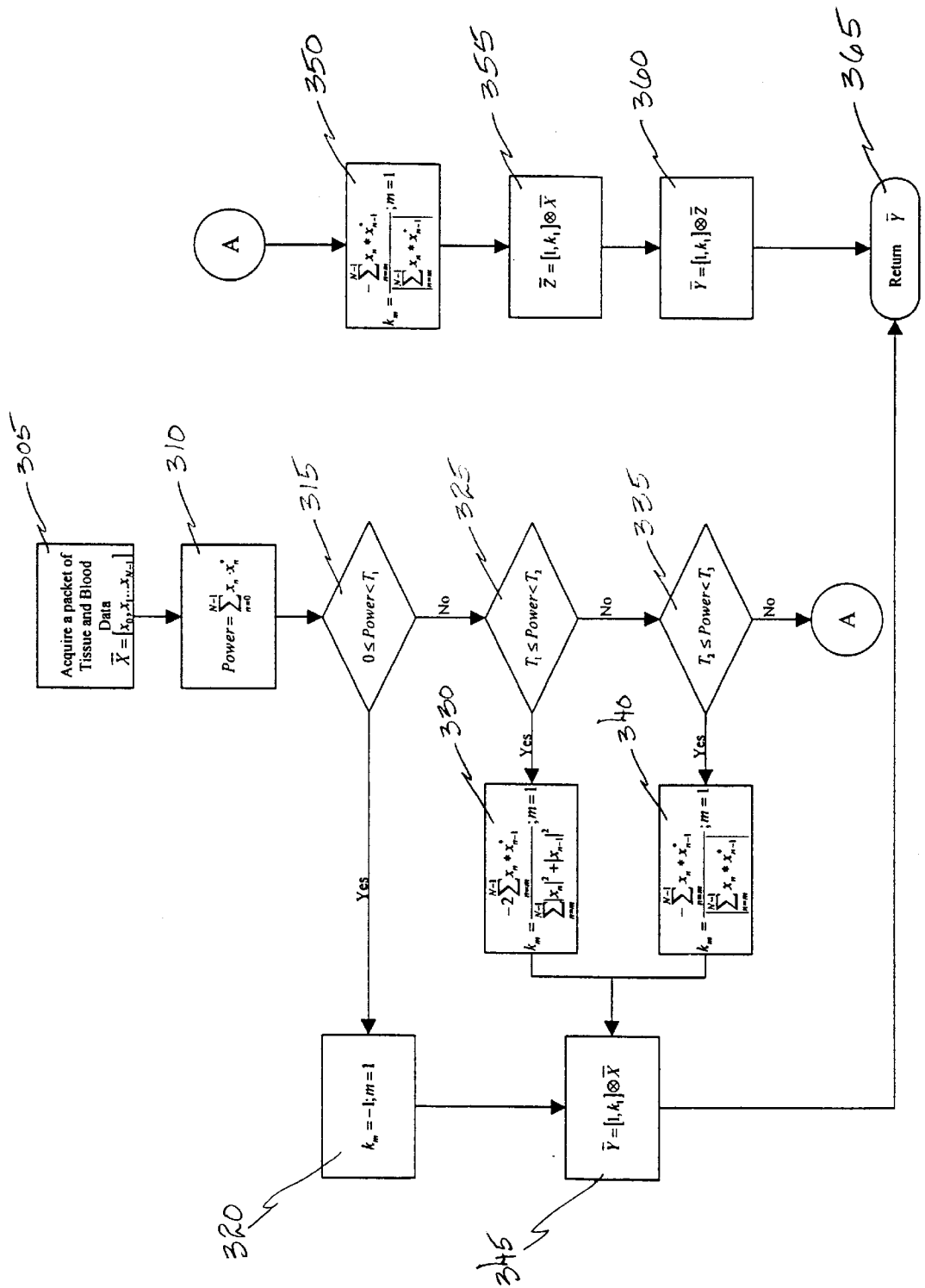
FIG. 3 is a flowchart of an adaptive clutter filter implemented in accordance with the present invention.

FIG. 3 is a flowchart of a method for adaptive filtering of clutter from a sample stream having a blood signal component and a clutter signal component in accordance with the present invention. In brief, the method comprises the steps of (a) estimating a signal strength of the sample stream, and (b) determining an order of a filter based on a relationship between the signal strength estimate and a signal strength threshold. The filter receives the sample stream and provides an output stream having a reduced level of the clutter signal component relative to the blood signal component.

This method uses signal power to determine the order of the filter and the formulation of the filter coefficients from either of equation 1 or equation 6, or from a fixed filter value. The method begins with step 305.

In step 305, the method acquires a packet of tissue and blood data:

$$\overline{X}=[x_0, x_1 \ldots x_{N-1}]$$

The method then advances to step 310.

In step 310, the method estimates the signal strength of the data.

$$\text{Power} = \sum_{n=0}^{N-1} x_n \cdot x_n^*$$

The method then advances to step 315.

In step 315, the method determines whether the signal strength is a value greater than or equal to zero and less than a first threshold ($T_1$).

$$0 \leq \text{Power} < T_1$$

If the signal strength is greater than or equal to zero and less than $T_1$, then the method advances to step 320. If the signal strength is not greater than or equal to zero and less than $T_1$, then the method branches to step 325.

In step 320, the method sets $k_1=-1$. The filter is configured as a first order filter.

$$k_m = -1; m=1$$

The method then advances to step 345.

In step 325, the method determines whether the signal strength is a value greater than or equal to the first threshold $T_1$ and less than a second threshold $T_2$.

$$T_1 \leq \text{Power} < T_2$$

If the signal strength is greater than or equal to $T_1$ and less than $T_2$, then the method advances to step 330. If the signal strength is not greater than or equal to $T_1$ and less than $T_2$, then the method branches to step 335.

In step 330, the filter is configured as a first order filter. $k_1$ is calculated using linear prediction in accordance with the following formula:

$$k_m = \frac{-2 \sum_{n=m}^{N-1} x_n * x_{n-1}^*}{\sum_{n=m}^{N-1} |x_n|^2 + |x_{n-1}|^2}; m = 1$$

The method then advances to step 345.

In step 335, the method determines whether the signal strength is a value greater than or equal to the second threshold $T_2$ and less than a third threshold $T_3$.

$$T_2 \leq \text{Power} < T_3$$

If the signal strength is greater than or equal to $T_2$ and less than $T_3$, then the method advances to step 340. If the signal strength is not greater than or equal to $T_2$ and less than $T_3$, then the method branches to step 350.

In step 340, the filter is configured as a first order filter. $k_1$ is calculated to force the adaptive filter coefficient on the unit circle in accordance with the following formula:

$$k_m = \frac{-\sum_{n=m}^{N-1} x_n * x_{n-1}^*}{\left| \sum_{n=m}^{N-1} x_n * x_{n-1}^* \right|}; m = 1$$

The method then advances to step 345.

In step 345, the method determines the output signal $\overline{Y}$ by convolving the input signal $\overline{X}$ with the filter coefficients as follows:

$$\overline{Y}=[1,k_1]\otimes \overline{X}$$

The method then advances to step 365.

In step 350, signal strength is greater than the maximum threshold, $T_3$. The filter is configured as a second order filter. $k_1$ is calculated according to the following formula:

$$k_m = \frac{-\sum_{n=m}^{N-1} x_n * x_{n-1}^*}{\left|\sum_{n=m}^{N-1} x_n * x_{n-1}^*\right|}; m=1$$

The method then advances to step 355.

In step 355, $\overline{X}$ is convolved with $[1, k_1]$, thus yielding an intermediate result $\overline{Z}$.

$$\overline{Z}=[1,k_1]\otimes \overline{X}$$

The method then advances to step 360.

In step 360, the method determines the filtered output signal $\overline{Y}$ by convolving the intermediate result $\overline{Z}$ with the filter coefficients as follows:

$$\overline{Y}=[1,k_1]\otimes \overline{Z}$$

The method then advances to step 365.

In step 365, the method provides the calculated result, $\overline{Y}$.

Figure 4:
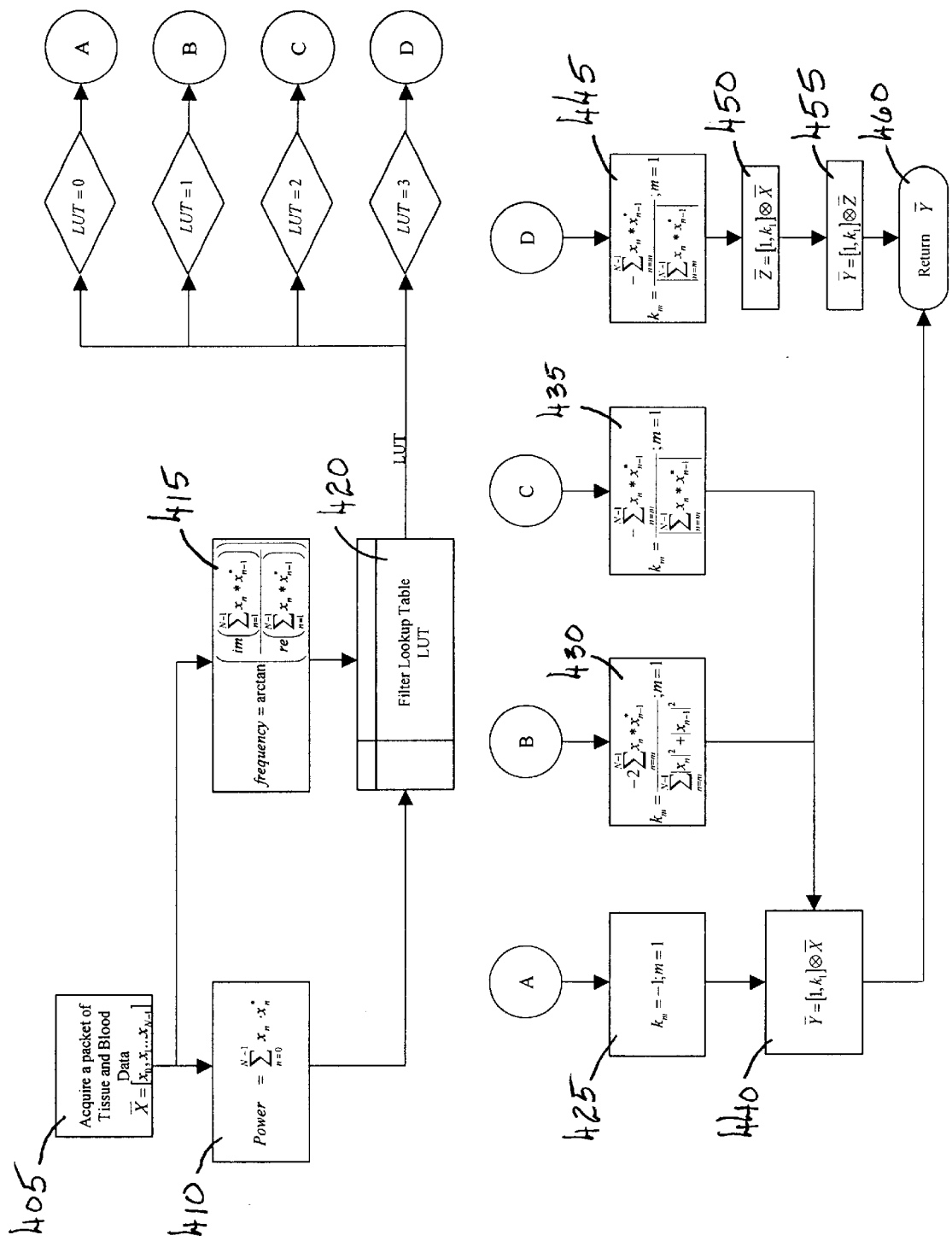
FIG. 4 is a flowchart of an alternative embodiment of an adaptive clutter filter implemented in accordance with the present invention.

FIG. 4 is a flowchart of another embodiment of a method for implementing a clutter filter in accordance with the present invention. In this method, the mean frequency of an input signal is used in combination with the signal strength to determine filter order. The method comprises the steps of (i) estimating a signal strength and a frequency of a sample stream, and (ii) determining an order of a filter based on (a) a relationship between the signal strength estimate and a signal strength threshold, and (b) a relationship between the frequency estimate and a frequency threshold. The method begins with step 405.

In step 405, the method acquires a packet of tissue and blood data:

$$\overline{X}=[x_0, x_1 \ldots x_{N-1}]$$

The method then advances to steps 410 and 415.

Step 410 is performed in parallel with step 415. In step 410, the method estimates the signal strength of the data.

$$\text{Power} = \sum_{n=0}^{N-1} x_n \cdot x_n^*$$

The method then advances to step 420.

Step 415 is performed in parallel with step 410. In step 415, the method determines the Doppler shifted frequency of the ultrasound input signal x(n) according to the following formula, where "im" is the imaginary part and "re" is the real part of the lag 1 autocorrelation of the input signal x(n).

$$\text{frequency} = \arctan\left(\frac{\text{im}\left(\sum_{n=1}^{N-1} x_n * x_{n-1}^*\right)}{\text{re}\left(\sum_{n=1}^{N-1} x_n * x_{n-1}^*\right)}\right)$$

The method then advances to step 420.

In step 420, the method uses the Power from step 410 and the frequency from step 415 as indices to a lookup table. The output of the lookup table indicates that the combination of Power and frequency falls into one of four cases, i.e., lookup table (LUT) case 0, 1, 2 or 3.

If case=0, then the method branches to step 425.
If case=1, then the method branches to step 430.
If case=2, then the method branches to step 435.
If case=3, then the method branches to step 445.

Table 1, below, illustrates a possible setup for the lookup table of step 420. The lookup table has two clutter frequency categories and four clutter power categories. Under the low frequency clutter category one of steps 425, 430, 435 or 445 are selected depending on the level of the clutter power. Under the high frequency clutter category one of steps 425 and 445 are selected depending on the clutter power. The high frequency clutter category assumes that the high and medium clutter power levels correspond to fast moving tissue such as a heart valve and provides very aggressive filtering of the clutter+blood signal from step 405. The low and very low clutter power levels for the high frequency clutter category assumes that the signal from step 405 is primarily blood and provides reduced filtering.

TABLE 1

|  | Low Frequency Clutter | High Frequency Clutter |
| --- | --- | --- |
| Very Low Power Clutter | LUT = 0 | LUT = 0 |
| Low Power Clutter | LUT = 1 | LUT = 0 |
| Medium Power Clutter | LUT = 2 | LUT = 3 |
| High Power Clutter | LUT = 3 | LUT = 3 |

In step 425, the method sets $k_1=-1$. The filter is configured as a first order filter.

$$k_m = -1; m=1$$

The method then advances to step 440.

In step 430, the filter is configured as a first order filter. The method calculates $k_1$ in accordance with the following formula:

$$k_m = \frac{-2\sum_{n=m}^{N-1} x_n * x_{n-1}^*}{\sum_{n=m}^{N-1} |x_n|^2 + |x_{n-1}|^2}; m=1$$

The method then advances to step 440.

In step 435, the filter is configured as a first order filter. The method calculates $k_1$ in accordance with the following formula:

$$k_m = \frac{-\sum_{n=m}^{N-1} x_n * x_{n-1}^*}{\left|\sum_{n=m}^{N-1} x_n * x_{n-1}^*\right|}; m=1$$

The method then advances to step 440.

In step 440, the method determines output signal $\overline{Y}$ by convolution with the filter coefficients as follows:

$$\overline{Y}=[1,k_1]\otimes \overline{X}$$

The method then advances to step 460.

In step 445, the filter is configured as a second order filter. $k_1$ is calculated according to the following formula:

$$k_m = \frac{-\sum_{n=m}^{N-1} x_n * x_{n-1}^*}{\left|\sum_{n=m}^{N-1} x_n * x_{n-1}^*\right|}; \quad m = 1$$

The method then advances to step 450.

In step 450, $\overline{X}$ is convolved with $[1, k_1]$, thus yielding intermediate result $\overline{Z}$.

$$\overline{Z} = [1, k_1] \otimes \overline{X}$$

The method then advances to step 455.

In step 455, the method determines the final filtered output signal $\overline{Y}$ by convolution of intermediate result $\overline{Z}$ with the filter coefficients according to the following:

$$\overline{Y} = [1, k_1] \otimes \overline{Z}$$

The method then advances to step 460.

In step 460, the method provides the calculated result, $\overline{Y}$.

Figure 6:
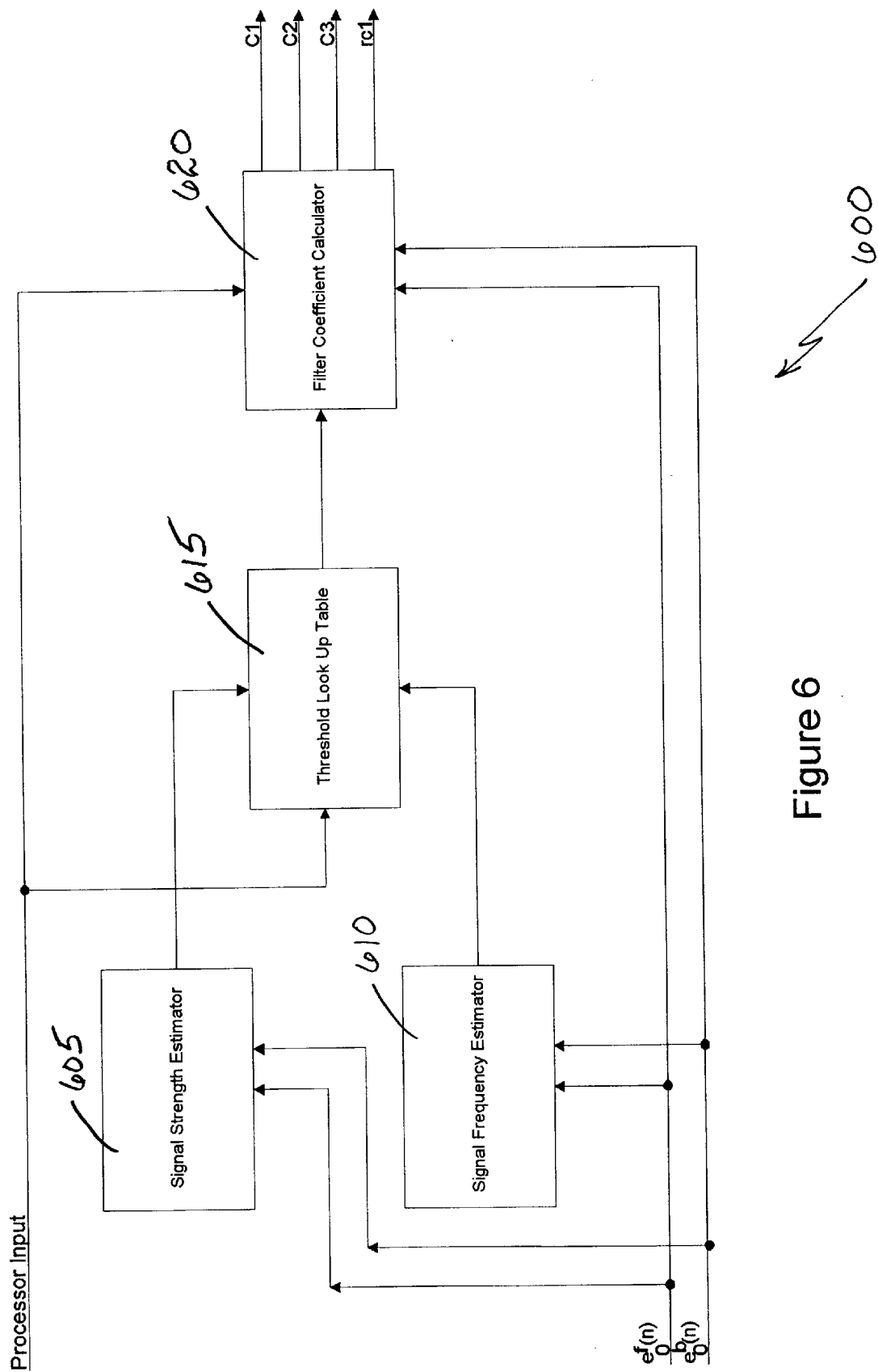
FIG. 6 is a block diagram of a preferred embodiment of a lattice filter coefficient calculator.

FIG. 6 is a block diagram of a preferred embodiment of a coefficient calculator 600, which may serve as either of coefficient calculator 120 in FIG. 1 or coefficient calculator 210 in FIG. 2. It effectively performs the steps of the methods described above in association with either of FIGS. 3 and 4. Coefficient calculator 600 includes modules for a signal strength estimator 605, a signal frequency estimator 610, a threshold lookup table 615 and a filter coefficient calculator 620.

Signal strength estimator 605 receives a sample stream that includes a forward prediction error $e^f_0(n)$ and a reverse prediction error $e^b_0(n)$. It produces a signal strength estimate of the sample stream. The signal strength estimate is provided as an input to threshold lookup table 615.

Signal frequency estimator 610 receives the sample stream that includes the forward prediction error $e^f_0(n)$ and the reverse prediction error $e^b_0(n)$. It produces a frequency estimate of the sample stream. The frequency estimate is provided as an input to threshold lookup table 615.

Threshold lookup table 615 has a processor input from an external source through which threshold lookup table 615 may be programmed with one or more signal strength thresholds, and one or more frequency thresholds. Threshold lookup table 615 receives the signal strength estimate from signal strength estimator 605 and the frequency estimate from signal frequency estimator 610. It compares the signal strength estimate to the signal strength threshold(s) and compares the frequency estimate to the frequency threshold(s). Threshold lookup table 615 produces an index that represents the results of the comparisons.

Filter coefficient calculator 620 receives the index from lookup table 615. Filter coefficient calculator 620 uses this index to determine the formulation for km and the values assigned to C1, C2, C3 and rc1, which define the filter order, zero(s) and center frequency.

Figure 5:
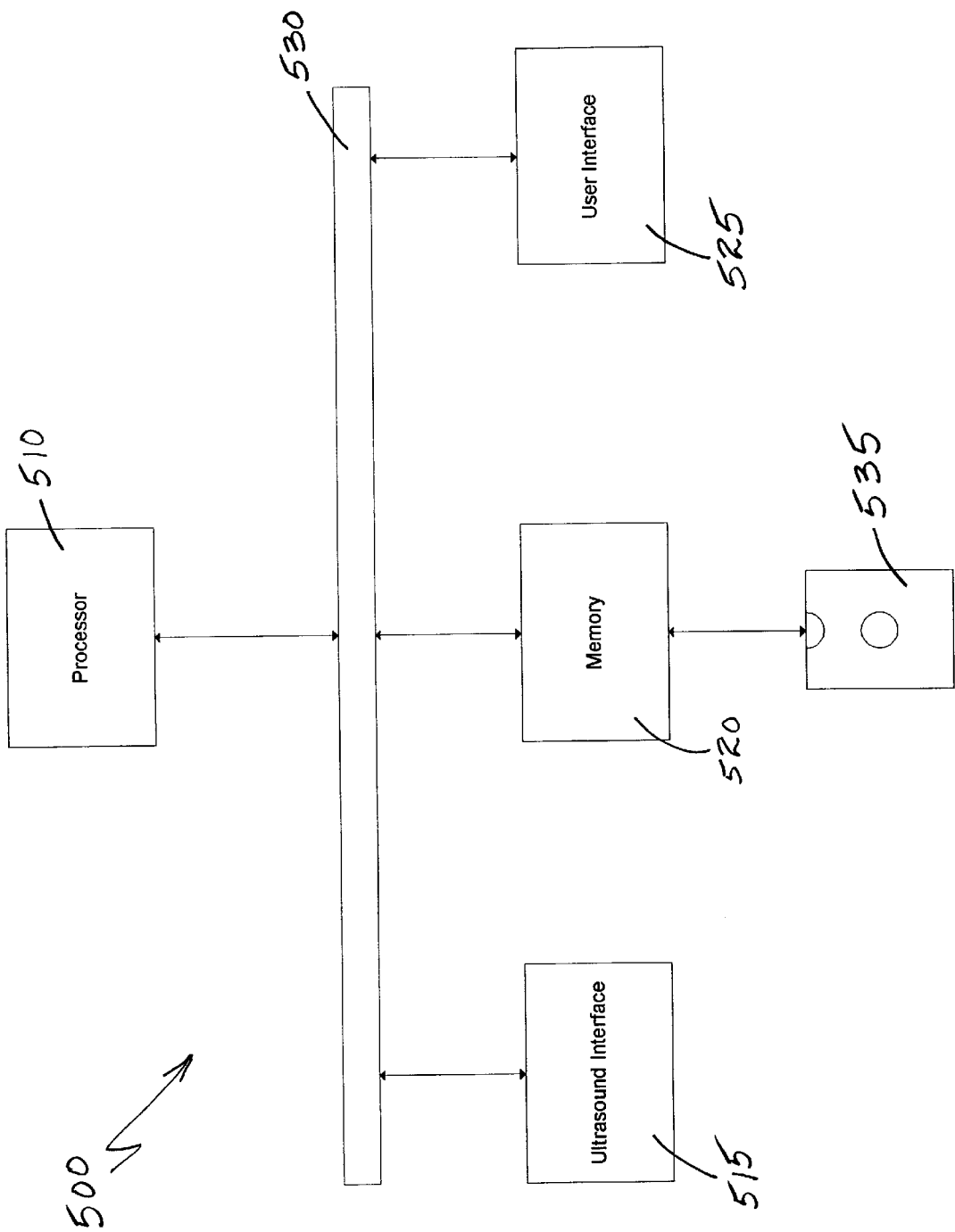
FIG. 5 is a block diagram of a computer system suited for execution of a program that implements a clutter filter in accordance with the present invention.

FIG. 5 is a block diagram of a computer system 500 suited for execution of a program that in turn performs the methods for implementing a clutter filter, as described above. More particularly, system 500 executes a program for adaptive filtering of clutter from a sample stream containing blood and clutter signals. In execution, the program performs the steps of (1) estimating signal strength and mean frequency of the sample stream, (2) generating filter coefficients from the signal strength estimates, the frequency estimates, K input signal strength thresholds and L input signal frequency thresholds, and (3) selecting an order of a filter based on the K input signal strength thresholds and the L input signal frequency thresholds.

System 500 includes a processor 510, an ultrasound interface 515, a memory 520, a user interface 525 and a communication bus 530. System 500 can be implemented on a general-purpose computer, such as a personal computer, or as a special purpose device in discrete hardware or firmware. Although it is represented here as a stand-alone system, system 500 can be integrated into an ultrasound system (not shown).

Processor 510 is a computer processing unit (CPU) for executing program instructions. Processor 510 controls the operation and exchange of data between the other components of system 500.

Ultrasound interface 515 enables a transfer of data from the ultrasound system (not shown) to the components of system 500. Such data represents images of tissue and blood acquired by scanning a body of a patient.

Memory 520 is for storage of data and instructions, and in particular the instructions for performing the methods described herein, for execution by processor 510. Memory 520 can be any form of conventional memory such as, for example, a random access memory (RAM), hard drive 145 and read-only memory (ROM).

User interface 525 is one or more components through which a user can input data or control parameters into system 500, and by which the user can observe processed results from system 500. User interface 525 can include, for example, a keyboard and a display. Such a display can be any conventional analog or digital display for presenting an image produced from ultrasound data.

Communication bus 530 is coupled to each of the other components of system 500. It provides a channel by which the other components can exchange data.

In operation, processor 510 receives ultrasound data from ultrasound interface 515. Processor 510 filters clutter from the data in accordance with a method described herein and sends the processed result to user interface 525.

While the procedures required to execute the invention hereof are indicated as already loaded into memory 520, they may be configured on a storage media, such as data memory 535, for subsequent loading into memory 520. Data memory 535 can be any conventional storage media such as a magnetic tape, an optical storage media, a compact disk, or a floppy disk. Alternatively, data memory 535 can be a random access memory, or other type of electronic storage, located on a remote storage system.

While described above in the context of a medical imaging system, those skilled in the art would recognize that the teachings of the present invention are not necessarily limited to medical imaging. The present invention can be applied to filtering of other signals that include a correlated noise component such as clutter.

Thus, it should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method for adaptive filtering of clutter from a sample stream having a blood signal component and a clutter signal component, said method comprising:
   estimating a signal strength of said sample stream; and
   determining an order of an adaptive clutter filter and generating its filter coefficients based on a relationship between said signal strength estimate and a signal strength threshold,
   wherein responsive to receiving said sample stream, said adaptive clutter filter provides an output stream having a reduced level of said clutter signal component relative to said blood signal component.

2. A method for adaptive filtering of clutter from a sample stream having a blood signal component and a clutter signal component, said method comprising:
   estimating a signal strength and a frequency of said sample stream; and
   determining an order of an adaptive clutter filter and generating its filter coefficients based on (a) a relationship between said signal strength estimate and a signal strength threshold, and (b) a relationship between said frequency estimate and a frequency threshold,
   wherein responsive to receiving said sample stream, said adaptive clutter filter provides an output stream having a reduced level of said clutter signal component relative to said blood signal component.

3. A method for adaptive filtering of clutter from a sample stream having a blood signal component and a clutter signal component, said method comprising:
   estimating a signal strength and a frequency of said sample stream; and
   determining a zero of an adaptive clutter filter based on a linear prediction analysis of said sample stream responsive to said signal strength estimate falling within a predetermined range of signal strengths and responsive to said frequency estimate falling within a predetermined range of frequencies,
   wherein responsive to receiving said sample stream, said adaptive clutter filter provides an output stream having a reduced level of said clutter signal component relative to said blood signal component.

4. A controller for an adaptive clutter filter for filtering of clutter from a sample stream having a blood signal component and a clutter signal component, comprising:
   a module for estimating a signal strength of said sample stream; and
   a module for determining an order of said adaptive clutter filter and generating its filter coefficients based on a relationship between said signal strength estimate and a signal strength threshold,
   wherein responsive to receiving said sample stream, said adaptive clutter filter provides an output stream having a reduced level of said clutter signal component relative to said blood signal component.

5. The controller of claim 4, wherein said module for determining and generating generates a filter coefficient for said adaptive clutter filter by a linear prediction analysis of said sample stream.

6. The controller of claim 4, further comprising:
   a module for estimating a frequency of said sample stream; and
   a module for determining a zero for said filter based on said frequency estimate.

7. The controller of claim 6, wherein said module for determining said zero obtains a filter coefficient for said filter from a lookup table.

8. The controller of claim 6, wherein said zero is on a unit circle.

9. A controller for an adaptive clutter filter for filtering of clutter from a sample stream having a blood signal component and a clutter signal component, comprising:
   a module for estimating a signal strength and a frequency of said sample stream; and
   a module for determining an order of said adaptive clutter filter and generating its filter coefficients based on (a) a relationship between said signal strength estimate and a signal strength threshold, and (b) a relationship between said frequency estimate and a frequency threshold,
   wherein responsive to receiving said sample stream, said adaptive clutter filter provides an output stream having a reduced level of said clutter signal component relative to said blood signal component.

10. The controller of claim 9, wherein said module for determining and generating generates a filter coefficient for said adaptive clutter filter by a linear prediction analysis of said sample stream.

11. The controller of claim 9, further comprising a module for determining a zero for said filter based on said frequency estimate.

12. The controller of claim 11, wherein said module for determining said zero obtains a filter coefficient for said filter from a lookup table.

13. The controller of claim 11, wherein said zero is on a unit circle.

14. A controller for an adaptive clutter filter for filtering of clutter from a sample stream having a blood signal component and a clutter signal component, comprising:
   a module for estimating a signal strength and a frequency of said sample stream; and
   a module for determining a zero of said adaptive clutter filter based on a linear prediction analysis of said sample stream responsive to said signal strength estimate falling within a predetermined range of signal strengths and responsive to said frequency estimate falling within a predetermined range of frequencies,
   wherein responsive to receiving said sample stream, said adaptive clutter filter provides an output stream having a reduced level of said clutter signal component relative to said blood signal component.

15. The controller of claim 14, further comprising a module for determining an order of said adaptive clutter filter based on a relationship between said signal strength estimate and a signal strength threshold.

16. The controller of claim 14, further comprising a module for determining an order of said adaptive clutter filter based on a relationship between said frequency estimate and a frequency threshold.

17. An ultrasound clutter filter comprising:
   a controller adapted to receive a sample stream having a blood signal component and a clutter signal component, said controller responsive to the sample stream for generating a filter coefficient based on (a) a signal strength threshold, (b) a signal frequency threshold, and (c) said sample stream; and
   an adaptive clutter filter adapted to receive said sample stream and said filter coefficient, said adaptive clutter filter having a variable configuration that is defined by said filter coefficient, said variable configuration including (a) a variable order, (b) an adaptive zero and (c) a variable center frequency,
   wherein responsive to receiving said sample stream, said adaptive clutter filter provides an output stream having a reduced level of said clutter signal component relative to said blood signal component.

18. The ultrasound clutter filter of claim 17, wherein said controller comprises:
- a signal strength estimator for estimating a signal strength of said sample stream;
- a signal frequency estimator for estimating a frequency of said sample stream;
- a module for defining said variable order based on said signal strength estimate and said frequency estimate; and
- a coefficient calculator for producing said filter coefficient based on said signal strength estimate and said frequency estimate.

19. The ultrasound clutter filter of claim 17, wherein said controller determines said filter coefficient by a linear prediction analysis of said sample stream.

20. The ultrasound clutter filter of claim 17, wherein said adaptive zero is on a unit circle.

21. The ultrasound clutter filter of claim 17, wherein said adaptive clutter filter comprises:
- a lattice filter for receiving said sample stream and providing an output; and
- finite impulse response filter for receiving said output of said lattice filter and for producing said output stream.

22. A storage medium comprising instructions on a computer recordable medium for controlling a processor for adaptive filtering of clutter from a sample stream having a blood signal component and a clutter signal component, including:
- instructions for estimating a signal strength of said samples stream; and
- instructions for determining an order of an adaptive clutter filter and generating its filter coefficients based on a relationship between said signal strength estimate and a signal strength threshold,
- wherein responsive to receiving said sample stream, said adaptive clutter filter provides an output stream having a reduced level of said clutter signal component relative to said blood signal component.

23. A storage medium comprising instructions on a computer recordable medium for controlling a processor for adaptive filtering of clutter from a sample stream having a blood signal component and a clutter signal component, including:
- instructions for estimating a signal strength and a frequency of said sample stream; and
- instructions for determining an order of an adaptive clutter filter and generating its filter coefficients based on (a) a relationship between said signal strength estimate and a signal strength threshold, and (a) a relationship between said frequency estimate and a frequency threshold,
- wherein responsive to receiving said sample stream said adaptive clutter filter provides an output stream having a reduced level of said clutter signal component relative to said blood signal component.

24. A storage medium comprising instructions on a computer recordable medium for controlling a processor for adaptive filtering of clutter from a sample stream having a blood signal component and a clutter signal component, including:
- instructions for estimating a signal strength and a frequency of said sample stream; and
- instructions for determining a zero of an adaptive clutter filter based on a linear prediction analysis of said sample stream responsive to said signal strength estimate falling within a predetermined range of signal strengths and responsive to said frequency estimate falls within a predetermined range of frequencies,
- wherein responsive to receiving said sample stream, said adaptive clutter filter provides an output stream having a reduced level of said clutter signal component relative to said blood signal component.

* * * * *